US012645039B2

(12) United States Patent

Michit et al.

(10) Patent No.: US 12,645,039 B2

(45) Date of Patent: Jun. 2, 2026

(54) OPTICAL SYSTEM COMPRISING A PHOTOELECTRIC TRANSDUCER COUPLED TO A WAVEGUIDE, AND MANUFACTURING METHOD THEREFOR

(71) Applicant: COMMISSARIAT À L'ENERGIE ATOMIQUE ET AUX ENERGIES ALTERNATIVES, Paris (FR)

(72) Inventors: Nicolas Michit, Grenoble Cedex (FR); Patrick Le Maitre, Grenoble Cedex (FR)

(73) Assignee: COMMISSARIAT À L' ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 259 days.

(21) Appl. No.: 18/529,296

(22) Filed: Dec. 5, 2023

(65) Prior Publication Data

US 2024/0184062 A1     Jun. 6, 2024

(30) Foreign Application Priority Data

Dec. 5, 2022     (FR) ....................................... 2212742

(51) Int. Cl.
G02B 6/42     (2006.01)

(52) U.S. Cl.
CPC .................................. G02B 6/4214 (2013.01)

(58) Field of Classification Search
CPC ...... G02B 6/42; G02B 6/4204; G02B 6/4206; G02B 6/4214; G02B 6/4295; G02B 2006/12104; H10F 77/488
See application file for complete search history.

(56) References Cited

U.S. PATENT DOCUMENTS

| | | | | |
|---|---|---|---|---|
| 5,369,529 A | * | 11/1994 | Kuo | ..................... G02B 6/4292 |
| | | | | 385/130 |
| 6,813,418 B1 | * | 11/2004 | Kragl | ................... G02B 6/4253 |
| | | | | 385/47 |
| 8,929,697 B1 | | 1/2015 | Conner | |

(Continued)

FOREIGN PATENT DOCUMENTS

WO     WO 2021/053096 A1     3/2021

OTHER PUBLICATIONS

Search Report as issued in French Patent Application No. FR2212742, dated Jun. 28, 2023.

(Continued)

*Primary Examiner* — Michael Stahl

(74) *Attorney, Agent, or Firm* — CUSHMAN PARTNERS, LLC

(57)     ABSTRACT

An optical system includes a substrate and, being formed on the substrate, a reflective structure including a first inner reflection face with a parabolic profile, a second inner planar reflection face and a third inner planar reflection face, a photoelectric transducer including an active region configured to emit light waves or configured to receive light waves and positioned in the reflective structure, at a part of the foci, the material of the reflective structure being chosen to be transparent to the light waves, a waveguide arranged so that its longitudinal axis is parallel to the optical axes and its proximal end is adjoining the reflective structure between the second and third reflection faces and at the active region.

13 Claims, 4 Drawing Sheets

(56)        References Cited

U.S. PATENT DOCUMENTS

| | | | | |
|---|---|---|---|---|
| 2006/0067090 | A1* | 3/2006 | Lee | G02B 6/4214 |
| | | | | 348/E9.027 |
| 2014/0072311 | A1* | 3/2014 | Giziewicz | G02B 6/4214 |
| | | | | 398/135 |
| 2016/0356970 | A1* | 12/2016 | de Jong | G02B 6/4214 |
| 2017/0351043 | A1* | 12/2017 | Park | G02B 6/4214 |
| 2018/0267238 | A1 | 9/2018 | Wang et al. | |
| 2019/0079253 | A1* | 3/2019 | Koumans | G02B 6/3652 |
| 2021/0356662 | A1* | 11/2021 | Kalman | H10H 20/853 |
| 2022/0390693 | A1* | 12/2022 | Krähenbühl | G02B 6/30 |

OTHER PUBLICATIONS

Andrade, N. M. ,et al., "Inverse design optimization for efficient coupling of an electrically injected optical antenna-LED to a single-mode waveguide," Optics Express 19802 Research Article, vol. 27, No. 14, Jul. 2019, 13 pages.

Dillon, T., et al., "Fiber-to-waveguide coupler based on the parabolic reflector," Optics Letters, vol. 33, No. 9, May 2008, pp. 896-898.

Dolores-Calzadilla, V., et al., "Waveguide-coupled nanopillar metal-cavity light-emitting diodes on silicon," Nature Communications, Feb. 2017, pp. 1-8.

Chen, K., et al., "Double-parabolic-reflectors acoustic waveguides for high-power medical ultrasound," Scientific Reports, nature research, (Year: 2019), pp. 1-10.

Tobia, A., et al., "Design and Experimental Verification of a Compact Gaussian Beam Source for Parallel-Plate Waveguide Tests," IEEE Transactions on Antennas and Propagation, vol. 66, No. 8, Aug. 2018, pp. 4288-4291.

Wang, Y., et al., "On-chip photonic system using suspended p-n junction InGaN/GaN multiple quantum wells device and multiple waveguides," Applied Physics Letters, vol. 108, (Year: 2016), pp. 162102-1-162102-5.

* cited by examiner

[Fig. 1]
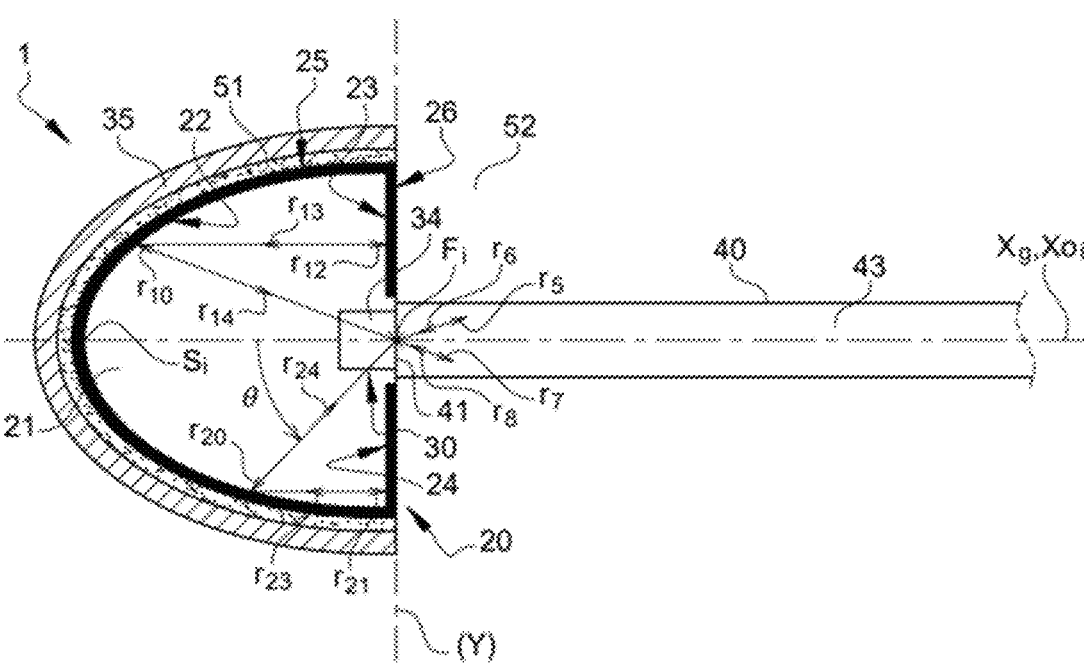
[Fig. 2]
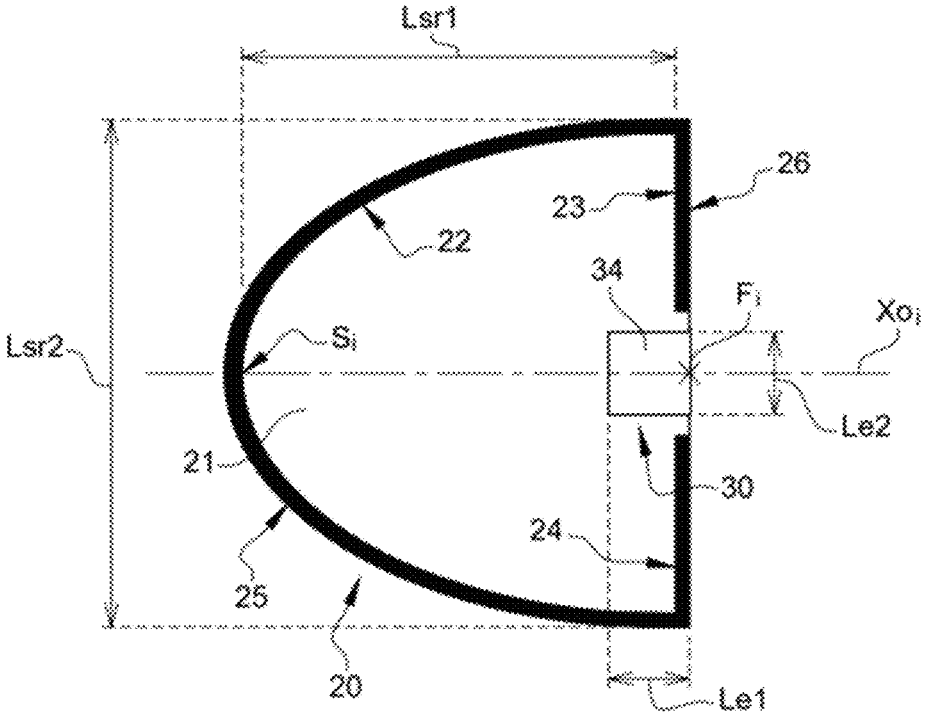

[Fig. 3]
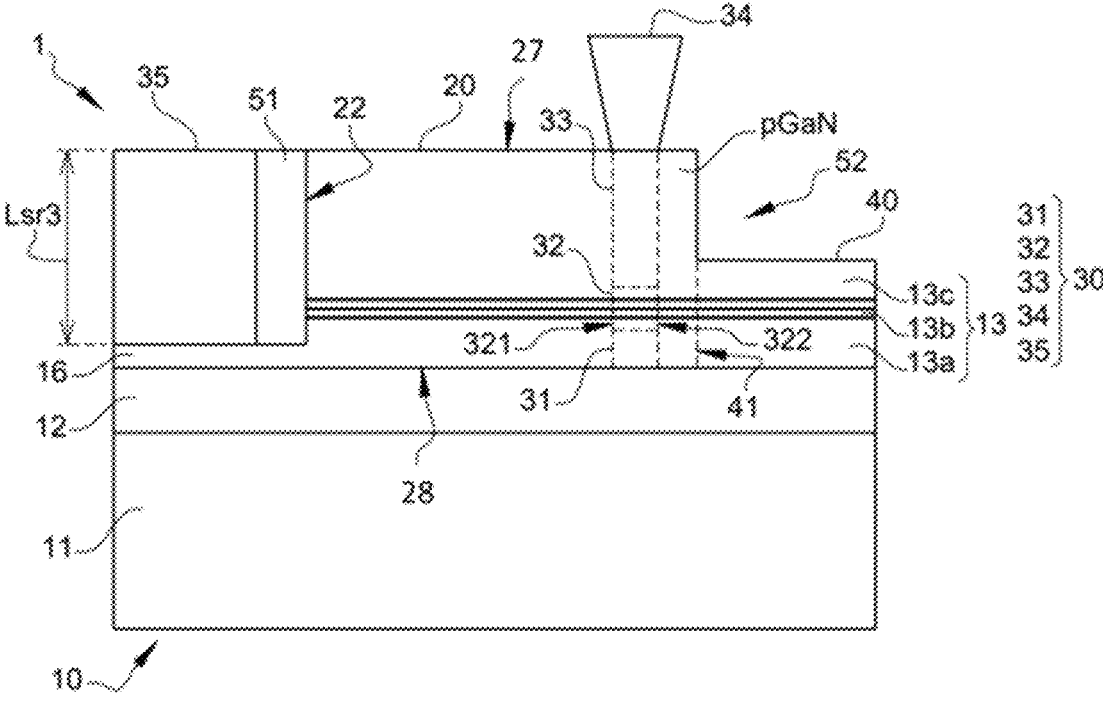
[Fig. 4]
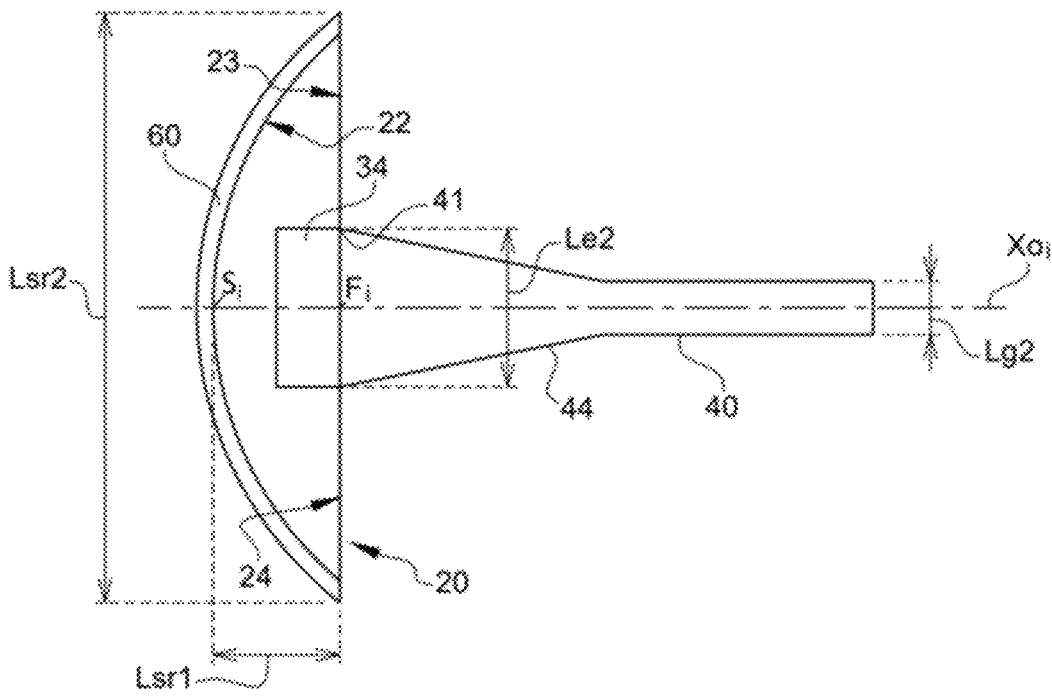

[Fig. 5A]
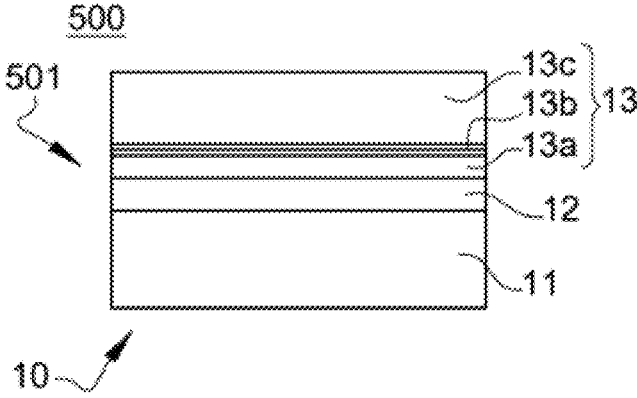
[Fig. 5B]
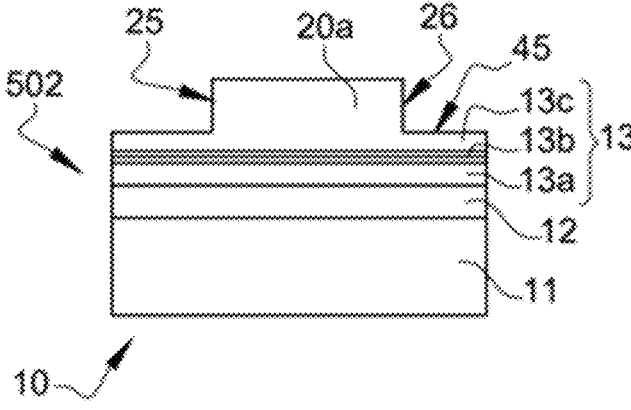
[Fig. 5C]
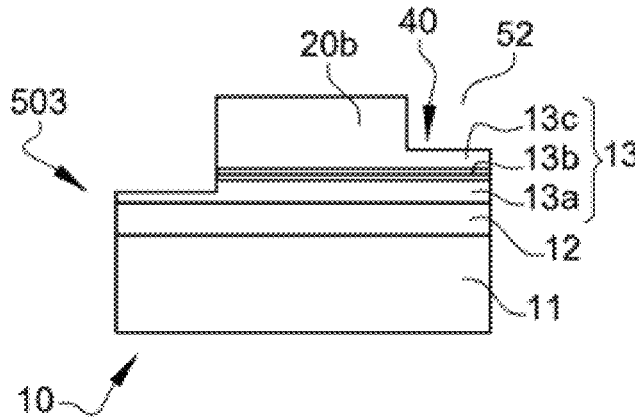

[Fig. 5D]
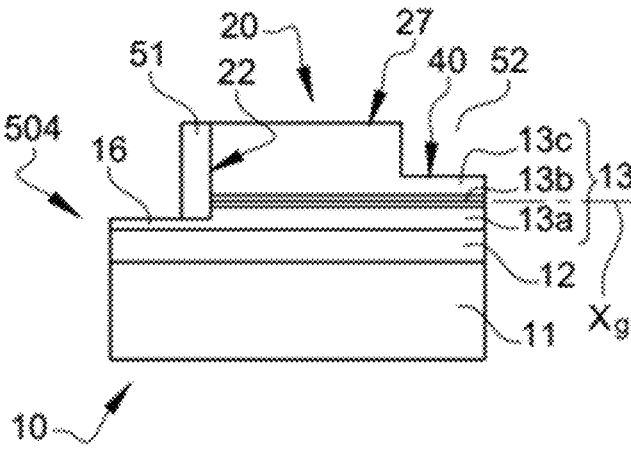
[Fig. 5E]
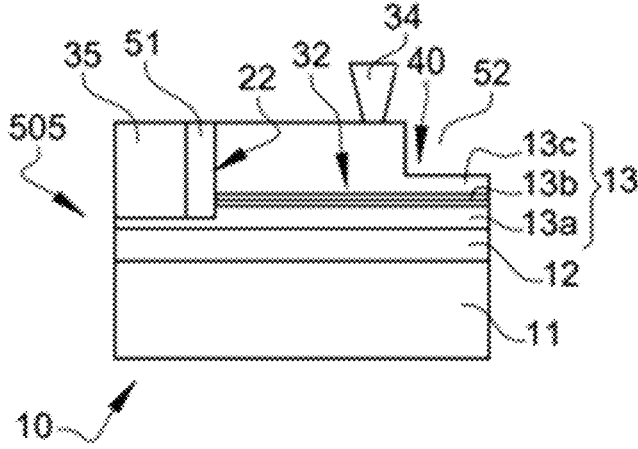

OPTICAL SYSTEM COMPRISING A PHOTOELECTRIC TRANSDUCER COUPLED TO A WAVEGUIDE, AND MANUFACTURING METHOD THEREFOR

CROSS-REFERENCE TO RELATED APPLICATIONS

This application claims priority to French Patent Application No. 2212742, filed Dec. 5, 2022, the entire content of which is incorporated herein by reference in its entirety.

FIELD

The technical field of the invention is that of photonic devices for intra- and inter-chip communication.

The present invention relates to an optical system using a semiconductor photoelectric transducer coupled to a waveguide.

BACKGROUND

In the field of inter- or intra-chip communication, the use of light to replace electrical signals makes it possible to overcome physical restrictions related to the impedance and size of metal interconnections, and thus to meet the need to transfer large quantities of data at very high speed.

Integrated photonic devices or platforms developed for this purpose comprise a light source, generally of micrometric dimensions, electrically excited and capable of being efficiently coupled to a photonic waveguide, which conveys light and thus carries information.

In this context, light-emitting diode (LED) architectures, also called LED sources or micro-LED sources, have recently been used as light sources. Compared with laser sources, they have the advantage of being low cost and low power consumption. It is also easier to reduce their dimensions down to the micrometre scale.

Such LED architectures are generally formed by a heterostructure based on a III-V semiconductor material, that is a body comprised of an element from column III and an element from column V of the Mendeleiev periodic classification. For example, LED sources are formed based on gallium nitride (or GaN). The heterostructure is further connected to two metal electrodes which, when a voltage is applied between them, excite the III-V semiconductor material and generate light emission.

However, the use of LED sources poses the problem of effectively coupling the light emitted into a waveguide.

A first difficulty is related to the fact that an LED source emits mutually incoherent waves. It is therefore not possible to use a so-called surface coupling technique, which consists in making use of phase matching phenomena to choose the propagation mode to which optical power is to be transferred.

A second difficulty is related to the fact that it is often necessary to choose a material for the waveguide with a refractive index lower than that of the LED. As light tends to propagate in the material with the highest refractive index, the result is that it can only pass very weakly from the LED to the guide, even if the LED and the guide are purely adjoining each other, or integrated with each other.

More precisely, containment of the light in the LED is due to the respective refractive indices and dimensions of the LED source and the waveguide.

Thus, the III-V semiconductor material of the LED has a higher refractive index than the material used for the waveguide: at 532 nm, the III-V semiconductor material GaN has a refractive index of approximately 2.4, whereas the silicon nitride SiN generally used for the waveguide has an index close to 2.

Furthermore, the LED generally has dimensions much larger than the dimensions of the waveguide. For example, the LED source may have a transverse extent in the order of 1 μm×0.2 μm and the guide an extent in the order of 150 μm×0.4 μm.

To overcome this difficulty and improve coupling efficiency of the radiation emitted by the LED source in the waveguide, one solution consists in forming the LED source and the guide from a single layer of material, according to a so-called monolithic integration.

Document "On-Chip photonic system using suspended p-n junction InGaN/GaN multiple quantum wells device and multiple waveguides", by Wang Y. et al, Applied Physics Letters, 2016 and patent US20180267238 describe a planar monolithic integration of an LED source and a waveguide from a layer of n-doped GaN.

Document "Waveguide-coupled nanopillar metal-cavity light-emitting diodes on silicon" by Dolores-Calzadilla V. et al, Nature Communication, 2017, describes a vertical monolithic integration of an LED source and a waveguide starting from a layer of p-doped InP. The LED source is then arranged on a segment of the waveguide.

However, using a monolithic integration does not solve the problem that a large part of the radiation emitted by the LED source is not transmitted to the waveguide, due to the fact that the LED also emits radiation in regions that are not adjacent to the end of the guide. Without means of collecting and returning this radiation to the waveguide, it is lost.

However, it is not easy to collect this "lost" radiation efficiently because it has a high angle range, or, stated differently, a high divergence.

The aforementioned patent US20180267238 describes a cavity formed under part of the LED source and waveguide. This cavity makes it possible to form an air/GaN interface favourable to better utilisation of the waves emitted in the vertical direction by the LED source. However, the waves laterally emitted in the direction opposite to the waveguide remain unused.

The previously cited document "Waveguide-coupled nanopillar metal-cavity light-emitting diodes on silicon" by Dolores-Calzadilla V. et al, Nature Communication, 2017 describes adapting the structure of the LED source by integrating the source into a metal cavity. In this structure, the cavity consists of a III-V semiconductor nanopillar that defines the nanoscale LED source. This nanopillar is coated with metal to channel a large part of the spontaneous emission into the fundamental mode of an InP waveguide.

The paper "Inverse design optimization for efficient coupling of electrically injected optical antenna-LED to a single-mode waveguide", by Andrade et al, Optics Express, 2019, also describes an LED structure integrated into a cavity surrounded by metal. The cavity acts as a resonant cavity that increases the spontaneous emission of the source. The structure is vertically or laterally coupled with a waveguide. The walls of the waveguide in proximity to the LED structure are thereby coated with the metal used for the metal cavity. However, the presence of metal (from the LED structure or the electrodes) in this zone is generally to be avoided as it introduces more optical losses into the LED or the waveguides.

In the field of integrated optical interconnections, there is therefore still a need for an LED source capable of being efficiently injected into a waveguide.

SUMMARY

An aspect of the invention offers a solution to the problems discussed above, by enabling the side radiation rearwardly emitted by an electrically controlled micrometric LED source to be collected and redirected frontwardly of the LED source, where the waveguide is located. Thus, this "rear" side radiation, which normally never reaches the end of the waveguide, is channeled into the numerical aperture of the waveguide. Symmetrically, if the electrically controlled micrometric receiver is a photodiode, the invention allows the radiation emitted forwardly by the waveguide to be collected and redirected towards the micrometric receiver.

For this, the LED source is integrated into a cylindro-parabolic reflective structure configured to reflect light rays coming from the rear face of this LED source and to make them converge at a place of foci located frontwardly of the LED source and in front of the end of the waveguide.

An aspect of the invention relates to an optical system comprising a substrate, a reflective structure, a photoelectric transducer and a waveguide, the reflective structure being formed by a cylindro-parabolic pillar disposed on the substrate, the cylindro-parabolic pillar being delimited by a cylindrical surface comprising a parabolic side surface and a planar side surface, and by two planar faces parallel to a plane of the substrate, and comprising:

a first inner reflection face with a parabolic profile disposed on the parabolic side surface of the cylindrical surface of the reflective structure, the first inner reflection face being defined by a plurality of parabolic sections parallel to the plane of the substrate, each parabolic section being defined by a parabola having an optical axis and a focus and extending from the apex of the parabola to the straight line perpendicular to the optical axis and passing through the focus, a second inner planar reflection face and a third inner planar reflection face disposed on the planar side surface of the cylindrical surface of the reflective structure, the second and third inner reflection faces being orthogonal to the plane of the substrate and to the plane including the optical axes of the plurality of parabolic sections and located on either side of said plane including the optical axes at the foci of the plurality of parabolic sections, the photoelectric transducer comprising an active region configured to emit light waves or configured to receive light waves, and arranged so that the active region is positioned in the reflective structure, at a part of the foci of the plurality of parabolic sections, the material of the reflective structure being chosen to be transparent to light waves, the waveguide having a proximal end, a distal end and a longitudinal axis parallel to the optical axes of the plurality of parabolic sections, and arranged on the substrate so that the proximal end is adjoining the reflective structure, between the second and third reflection faces and at the active region.

By virtue of an aspect of the invention, the reflective structure has a first inner reflection face with a parabolic profile defined by a plurality of parabolic sections parallel to the plane of the substrate, each parabolic section being defined by a parabola having an optical axis and a focus and extending from the apex of the parabola to the straight line perpendicular to the optical axis and passing through the focus.

Thus, this first inner reflection face acts like a two-dimensional parabolic mirror and obeys, in each plane parallel to the plane of the substrate, the laws of geometrical optics specific to parabolic mirrors.

Thus, in each plane parallel to the plane of the substrate, the first inner reflection face provides at its focus (located on the optical axis) a perfect image of a point located at infinity. This means that rays coming from an isotropic light source placed at the focus are reflected (on this first inner reflection face) in parallel to the optical axis. Symmetrically, light rays originating in parallel to the optical axis are reflected by the first inner reflection face at a point located at the focus.

All the foci of the plurality of parabolic sections define a straight line segment forming the locus of foci of the first inner reflection face.

As the photoelectric transducer comprises an active region configured to emit light waves or configured to receive light waves, the active region behaves as an isotropic light source or as a light receiver. By "light waves" it is meant waves having at least one wavelength in the spectral band between 200 nm and 1200 nm.

This active region is positioned in the reflective structure, at some of the foci of the plurality of parabolic sections. Thus, the active region has a side face (referred to as the rear face) oriented towards the first inner reflection face and located in proximity to the location of foci thereof. In each plane parallel to the plane of the substrate, the active region therefore corresponds to a point located at the focus of the parabolic section. From the above, light rays emanating therefrom are reflected by the first inner reflection face, in parallel to the optical axis. Symmetrically, light rays coming from the first inner reflection face in parallel to the optical axis are reflected towards the active region.

In addition, the reflective structure has a second inner planar reflection face and a third inner planar reflection face, which are orthogonal to the plane of the substrate and to the plane including the optical axes of the plurality of parabolic sections.

Thus, the second and third inner reflection faces act as planar mirrors disposed frontwardly of the two-dimensional parabolic mirror in a plane perpendicular to the plane of the substrate. This means that, in each plane parallel to the plane of the substrate, light rays that have been reflected by the first inner reflection face in parallel to the optical axis are reflected in the same direction by either the second or third inner reflection face. Accordingly, these light rays from either the second or third inner reflection face are then directed towards the active region by further reflection from the first inner reflection face. Thus, light rays are concentrated in a zone with dimensions equivalent to those of the active region. This makes it possible to use a waveguide which has dimensions (in a cross-section) comparable to those of the active region without introducing coupling losses (compared with systems in which the region where the rays emitted by the active region are concentrated has dimensions much larger than those of the active region, or much larger than the dimensions typical of waveguides used in integrated optics).

The fact that the dimensions of the waveguide section are comparable to those of the active region opens the way to an optical system comparable to a single-mode waveguide, and therefore having improved performance, especially in terms of guidance.

The fact that the second inner reflection face and the third inner reflection face are located on either side of the plane including the optical axes at the foci of the plurality of parabolic sections means that the waveguide can be adjoining the reflective structure at the active region and as close as possible to the foci of the parabolic reflective structure. Thus, the face of the active region opposite to the rear face, referred to as the front face, is adjoining or at least located close to the proximal end of the waveguide. This improves light coupling between the active region and the waveguide.

It is appropriate to further mention that using a material for the reflective structure that is transparent to light rays emitted or received by the active region makes it possible to make the inner reflection faces from a solid pillar. The benefit is that such a pillar can be made using standard microelectronic manufacturing techniques (layer structuring, for example). Stated differently, the entire optical system is compatible with microelectronic manufacturing methods.

Another benefit of using a solid, transparent parabolic cylinder incorporating the active region is that there is index continuity within the reflective structure. This index continuity reduces optical losses and therefore contributes to the improvement of light coupling between the active region and the waveguide.

The combination of these different characteristics therefore makes it possible to obtain an integrated optical interconnection (or integrated photonic system) in which the photoelectric transducer has dimensions comparable to the section of the waveguide while being efficiently coupled thereto, since the rear and front rays emitted by the active region are collected, and concentrated, by the reflective structure at the entrance to the waveguide. The expression "effectively coupled" refers to the fact that the fraction of optical power transmitted to the waveguide (when the photoelectric transducer is a light source) or to the photoelectric transducer (when the photoelectric transducer is a light receiver) is increased.

Beneficially, the photoelectric transducer comprises an upper electrode and a lower electrode, the upper electrode being positioned on the upper planar face of the reflective structure in vertical alignment with the zone predetermined for the active region, and having lateral dimensions corresponding to the predetermined dimensions for the active region.

Thus positioned, the upper electrode is located at a distance from the active region and from the proximal end of the waveguide. The metal that forms it causes little or no disturbance to the light rays, which reduces optical losses and is conducive to improved coupling efficiency.

Thus, by virtue of the two planar faces of the reflective structure parallel to the substrate, the electrodes of the photoelectric transducer are positioned outwardly of reflective structure. This reflective structure can therefore be formed by a single transparent material (the active region is defined solely by the electrodes of the photoelectric transducer). This continuity of material, which implies a continuity of optical index within the reflective structure, makes it possible to minimize optical losses in this reflective structure, and therefore to improve light coupling into the waveguide.

It should also be noted that the position of the upper electrode preserves transparency of the reflective structure. Furthermore, as the size and position of the active region are defined by the size and position of the upper electrode, no engraving operation on the transducer flanks is necessary, thereby using a simple manufacturing method.

Beneficially, a first medium is arranged outwardly of reflective structure in a space adjacent to the first inner reflection face and a second medium is arranged outwardly of reflective structure and the waveguide in the space adjacent to the second inner reflection face and in the space adjacent to the third inner reflection face, the first and second medium having a refractive index strictly lower than the refractive index of the transparent material chosen for the reflective structure.

Thus, the inner reflection faces are obtained by an interface between two media. The benefit is that these inner reflection faces can be made from a solid pillar, in a simple manner compatible with standard microelectronic manufacturing methods.

According to a first alternative embodiment, the first medium is formed by a dielectric material and the second medium comprises air.

The dielectric material makes it possible to define the first inner reflection face at the same time as it makes it possible to electrically insulate flanks of the reflective structure.

Air makes it possible to define the second and third inner reflection faces without requiring a metal material likely to interfere with the propagation of light rays in proximity to the active region and/or the waveguide. Indeed, unlike the first inner reflection face, the second and third inner reflection faces are located in proximity to the waveguide and the active region, and it is desirable to avoid any addition of metal in this zone.

According to a second alternative, the first and second media are formed by a dielectric material.

The dielectric material makes it possible to define the inner reflection faces at the same time as it makes it possible to electrically insulate flanks of the reflective structure.

Beneficially and in a manner compatible with the two preceding alternative embodiments, a wall of metal material is disposed in the first medium and in proximity to the first inner reflection face.

Thus, the wall of metal material allows the first inner reflection face to work in specular reflection or total reflection. The fraction of reflected radiation is increased in relation to a transparent material/dielectric medium interface. As this face is far from the active region and the waveguide, the metal wall has no impact on the containment of light rays at the active region or the proximal end of the waveguide.

Further to the characteristics just discussed in the preceding paragraph, the optical system according to one aspect of the invention may have one or more complementary characteristics from among the following, considered individually or according to any technically possible combinations.

The photoelectric transducer is formed by a P-N junction and quantum wells disposed in the P-N junction.

The material of the P-N junction is a III-V material such as a GaN-based material.

The transparent material chosen for the reflective structure is the material of the P-N junction.

Thus, the reflective structure and the photoelectric transducer form a single solid part with a homogeneous refractive index. The benefit is that the figure of merit of the reflective structure is improved, which results in a better coupling efficiency.

The waveguide is formed by the material of the P-N junction and the quantum wells.

Thus, the waveguide is adjoining the reflective structure without the need to etch the quantum wells of the photoelectric transducer. The benefit is that electrical problems are avoided.

A layer of metal material is disposed in the second medium, in proximity to the second inner reflection face and in proximity to the third inner reflection face.

Thus, the second and third inner reflection faces behave as total reflection surfaces.

The reflective structure has a lateral height dimension in the plane of the substrate strictly greater than a size of the waveguide.

In an embodiment, the height is 18 times greater than the size of the guide.

Thus, even highly divergent light rays (or rays at a large angle to the optical axis of the first inner reflection face) are collected and effectively redirected towards the active region or the waveguide. The reflective structure also remains compact.

The waveguide comprises a proximal end which is enlarged relative to the dimensions of the waveguide.

This configuration of the waveguide allows light emitted from the active region and redirected to the proximal end of the waveguide by the reflective structure to be more effectively coupled.

Another aspect of the invention relates to a method for making an optical system according to the first aspect of the invention comprising the steps of:

Providing a substrate comprising a substrate layer, a buffer layer arranged on the substrate layer and a P-N junction arranged on the buffer layer, Three-dimensionally structuring the P-N junction so as to define an upper face of the waveguide as well as a part of the cylindro-parabolic pillar forming the reflective structure, the structuring comprising lithography sub-steps.

Vertically etching the P-N junction on either side of the cylindro-parabolic pillar formed to complete definition of the waveguide and the cylindro-parabolic pillar forming the reflective structure, and to define a bonding layer, Passivating the first dielectric medium outwardly of the cylindro-parabolic pillar by conformal deposition, at the first inner reflection face, to obtain the reflective structure, Forming an upper electrode on the upper face of the P-N junction at the foci of the plurality of parabolic sections, and of a lower electrode on the bonding layer to complete the photoelectric transducer and the optical system.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 schematically represents, in a top view, a first embodiment of the optical system, FIG. 2 shows an enlarged top view of the reflective structure and photoelectric transducer of the optical system of FIG. 1, FIG. 3 is a cross-section view of the optical system of FIG. 1, FIG. 4 schematically represents, in a top view, a second embodiment of the optical system, FIGS. 5A to 5E represent, in cross-section view, steps or sub-steps of manufacturing the optical system of FIG. 1.

Unless otherwise specified, a same element appearing in different figures has a single reference.

DETAILED DESCRIPTION

The first aspect of the invention relates to the field of integrated photonics. In particular, the first aspect of the invention relates to a guided optics system based on a photoelectric transducer formed by a P-N junction and laterally integrated with a waveguide. The optical system according to the invention is remarkable especially in that it makes it possible to improve lateral coupling of this photoelectric transducer with the waveguide.

A first embodiment of the optical system will be described with reference to FIG. 1, FIG. 2 and FIG. 3.

A second embodiment will then be described with reference to FIG. 4.

In common to the first and second embodiments, the optical system 1 comprises a photoelectric transducer 30, a waveguide 40 and a reflective structure 20 carried by a substrate 10.

These elements 10, 20, 30 and 40 are described individually below.

With reference to FIG. 3, the substrate 10 comprises a substrate layer 11, for example a sapphire substrate layer, a buffer layer 12, for example of aluminium nitride, arranged on substrate layer 11. This buffer layer 12 carries the photoelectric transducer 30, the waveguide 40 and the reflective structure 20.

Still with reference to FIG. 3, the photoelectric transducer 30 comprises a lower region 31, an active region 32 and an upper region 33 formed in a P-N junction 13, as well as two electrodes 34, 35, one of them, referred to as the upper electrode 34, being connected to the P layer 13c of the P-N junction 13 and the other one, referred to as the lower electrode 35, being connected to the N layer 13a of this P-N junction 13 via a bonding layer 16.

The photoelectric transducer 30 is a receiving optical system when the active region 32 is able to transform an optical signal (illustrated by rays $r_6$ and $r_8$ in FIG. 1) received from the waveguide 40 into an electrical signal, or an emitting optical system when the active region 32 is able to generate an optical signal (illustrated especially by rays $r_5$ and $r_7$ in FIG. 1) towards the waveguide 40 under the effect of an electrical signal. The electrical signals are conveyed/applied by electrodes 34, 35.

In the remainder of the description, a photoelectric transducer 30 of the emitter type, thus having an active emitter region 32 will be considered. However, the general principle of the invention naturally applies to a receiving photoelectric transducer comprising a receiving active region 32.

It should be noted that the terms "optical signal" or "light waves" refer to electromagnetic waves comprising at least one wavelength in the spectral band ranging from 200 nm to 1200 nm.

The material of the photoelectric transducer corresponds to the material 13 forming the P-N junction.

This material 13 is a semiconductor material such as a III-V semiconductor material or a IV-IV semiconductor, or even a II-VI semiconductor, having a high refractive index in the 200 nm-1200 nm spectral band, for example greater than 2.

In an embodiment, the material 13 of the photoelectric transducer is a III-V semiconductor material.

As used herein, the term "III-V semiconductor material" means and includes any semiconductor material that is at least predominantly comprised of one or more elements from group IIIA of the periodic table (B, Al, Ga, In and Tl) and one or more elements from group VA of the periodic table (N, P, As, Sb and Bi). For example, III-V semiconductor materials include, but are not limited to, GaN, GaP, GaAs, InN, InP, etc.

For example, the photoelectric transducer material is based on gallium nitride GaN. The refractive index of such a material is 2.4 at a wavelength of 532 nm.

The lower 31, active 32 and upper 33 regions are respectively formed in the N layer 13a, the quantum wells 13b and the P layer 13c of the P-N junction 13. They are successively connected from bottom to top.

For example, the N layer 13a is an nGaN layer, the P layer 13c is a pGaN layer and the quantum wells 13b are formed by alternating InGaN and GaN layers.

The active region 32 is defined by the upper electrode 34 and the configuration of the P-N junction.

Thus, the position and lateral dimensions of the upper electrode 34 determine the position and dimensions of the active region 32 and the upper and lower regions 31,32 on the substrate 10. Stated differently, the upper electrode 34 defines the lateral dimensions and position of the photoelectric transducer 30.

These lateral dimensions Le1, Le2 of the upper electrode 34 are represented in FIG. 2. In an embodiment, they are in the order of a few hundred nanometres, for example 200 nm or 400 nm. For the sake of simplicity, the first lateral dimension Le1 can be taken to be equal to the second lateral dimension Le2. As will be described later in the description, the lateral dimensions Le1 and Le2 of the upper electrode 34 are related to the dimensions of the reflective structure 20 and are therefore determined as a function of the dimensions of this reflective structure 20.

The configuration of the P-N junction determines optical and photoelectric properties of the active region 32.

The configuration of the P-N junction is thus chosen so that the active region behaves, under the effect of an electrical excitation provided by the electrodes 34, 35, as a point and isotropic light source, in each plane parallel to the plane of the substrate 10. The wavelength of the radiation is, for example, in the green range, around 532 nm.

The radiation emitted by the active region 32 in a plane i parallel to the plane of the substrate 10 is illustrated in FIG. 1 using a geometric optical description. The radiation is emitted with a wide angular range Θ, as illustrated by rays $r_{10}, r_{20}, r_5, r_7$ represented in FIG. 1. Part of the rays is emitted (for example rays $r_{10}, r_{20}$) by a side face called the rear face 321 (see FIG. 3) of the active region 32. Another part is emitted by a side face opposite to the rear face 321 (see FIG. 3), referred to as the front face 322 of the active region 32.

With reference to FIG. 1, the reflective structure 20 surrounds the photoelectric transducer 30 at the stack formed by the lower 31, active 32 and upper 33 regions.

Precisely, the reflective structure 20, together with the lower 31, active 32 and upper 33 regions of the photoelectric transducer 30, forms a solid cylindro-parabolic pillar 20. Stated differently, the pillar 20 is a truncated straight cylinder, the axis and generatrices of which are perpendicular to the plane of the substrate 10, and the directrix curve of which is a parabola with axis $X_{oi}$ parallel to the plane of the substrate 10 and having as its focus a point $F_i$ located on the axis $X_{oi}$. This straight cylinder is truncated by a plane parallel to the generatrices and comprising the focus $F_i$. The pillar 20 is thus delimited by a cylindrical surface comprising a parabolic side surface 25 and a planar side surface 26 and by two planar faces 27, 28 (see FIG. 3) parallel to the plane of the substrate 10.

The two planar faces 27, 28 make it possible to place the electrodes 34, 35 of the photoelectric transducer outwardly of reflective structure 20, in vertical alignment with the active region of the photoelectric transducer.

The material 21 chosen for the reflective structure 20 is a material transparent to light waves emitted by the active region 32. It has a refractive index close to or equal to the refractive index of the material of the photoelectric transducer in the wavelength range 400 nm-800 nm. By "close" it is meant that the index difference is less than 0.2.

In an embodiment, the transparent material 21 chosen for the reflective structure 20 is identical to the material 13 of the photoelectric transducer 30. When the latter is based on GaN, the refractive index of the reflective structure is 2.4. Stated differently, the reflective structure 20 and the active region 32 of the photoelectric transducer have the same refractive index. This reduces optical losses in the reflective structure and therefore improves light coupling between the active region and the waveguide.

The reflective structure 20 comprises, in proximity to the parabolic side surface 25, a first inner reflection face 22 and, in proximity to the planar side surface 26, a second inner reflection face 23 and a third inner reflection face 24.

More precisely, as shown in FIG. 1, the first inner reflection face 22 rests on, or is disposed on, the parabolic side surface 25 of the cylindrical surface of the reflective structure.

As further shown in FIG. 1, the second inner reflection face 23 and the third inner reflection face 24 rest on, or are disposed on, the planar side surface 26 of the cylindrical surface of the reflective structure. These second and third inner reflection faces are also disposed on either side of the foci $F_i$.

The first inner parabolic reflection face 22 has geometric characteristics similar to those of the parabolic surface 25 of the cylindrical surface of the reflective structure. With reference to FIG. 1, the first inner reflection face 22 has a parabolic profile defined by a plurality of parabolic sections parallel to the plane of the substrate 10. Such a section is illustrated in FIG. 1. Each parabolic section is defined by the parabola having the optical axis $X_{oi}$ and the focus $F_i$, and extends from the vertex Si of the parabola to the straight line y perpendicular to the optical axis $X_{oi}$ and passing through the focus $F_i$.

The second inner reflection face 23 and the third inner reflection face 24 have geometric characteristics similar to the planar side surface 26 of the cylindrical surface of the reflective structure. The second inner reflection face 23 and the third inner reflection face 24 are planar faces, orthogonal to the plane of the substrate 10 and to the plane including the optical axes $X_{oi}$ of the plurality of parabolic sections. These faces 23, 24 are further located on either side of said plane including the optical axes $X_{oi}$ at the foci $F_i$ of the plurality of parabolic sections.

The inner reflection faces 22, 23, 24 are able to reflect inwardly of the reflective structure 20 light waves emitted by the active region inside the reflective structure 20. Stated differently, the inner faces 22, 23 and 24 act as semi-reflective surfaces.

For this, a first medium 51 is disposed outwardly of the reflective structure 20 in a space adjacent to the first inner reflection face 22. Stated differently, the second medium 51 coats the parabolic side surface 25 of the reflective structure 20 over its entire height. Furthermore, a second medium 52 is disposed outwardly of the reflective structure on the side of the planar side surface 26, in the space adjacent to the second inner reflection face 23 and in the space adjacent to the third inner reflection face 24.

The first and second media 51, 52 have a refractive index strictly lower than the refractive index of the transparent material 21 chosen for the reflective structure (or of the material 13 of the photoelectric transducer 30).

In an embodiment, the first medium 51 is formed by a dielectric material and the second medium 52 comprises air.

The dielectric material is, for example, silicon oxide.

Thus the refractive index of the first and second media 51, 52 is close to 1, while the refractive index of the reflective structure 20 and the photoelectric transducer 30 is 2.4. The first dielectric medium 51 then forms a dielectric wall 51 surrounding the parabolic side surface of the reflective structure 20.

Another possibility is that the first and second dielectric media 51,52 are both formed by a dielectric material (not represented in FIG. 1, 2 or 3).

To conclude the description of the reflective structure 20, it should be set out that it has lateral dimensions (cf. FIG. 2) of length Lsr1 along the optical axis $X_{oi}$, and height Lsr2 along the straight line y, as well as height Lsr3 (according to an axis perpendicular to the plane of the substrate 10, cf. FIG. 3).

For example, the lateral dimension of length Lsr1 is 1 micron and the lateral height dimension Lsr2 is 4 microns. The side height dimension Lsr2 is related to the side length dimension Lsr1 by the parabola equation.

With reference to FIG. 1, the waveguide 40 has a proximal end 41, a distal end 42 (not represented in FIG. 1), and a longitudinal axis $X_g$.

The waveguide 40 is formed by a semiconductor material 43 having a refractive index, referred to as the refractive index of the guide, of the same order of magnitude as the refractive index of the material 13 of the photoelectric transducer 30. The waveguide 40 is further surrounded by one or more media 52, 12 having a refractive index strictly lower than the refractive index of the waveguide 40 (and of the material 13 of the photoelectric transducer).

The waveguide 40 is for example formed by silicon nitride SiN.

In an embodiment, the waveguide 40 is formed by the same material as the material 13 of the photoelectric transducer 30 and comprises the quantum wells 13b. This provides index continuity between the active region, the reflective structure and the waveguide which promotes better light coupling.

The arrangement of the photoelectric transducer 30, the reflective structure 20 and the waveguide 40 in the optical system 1 with respect to each other is described below.

Firstly, the photoelectric transducer 30 is arranged so that the active region 32 is positioned in the reflective structure 20, at a part of the foci Fi of the plurality of parabolic sections. The lateral dimensions Le1 and Le2 of the upper electrode 34 (and therefore of the active region 32) are at least ten times smaller than the side length and height dimensions Lsr1 and Lsr2 of the reflective structure 20.

In FIG. 1, the active region 32 occupies a zone corresponding to the upper electrode 34. This is laterally positioned at or in proximity to the focus Fi of the first inner reflection face 22.

Thus, the rear side face 321 of the active region is oriented towards the parabola formed by the first inner reflection face 22.

Secondly, the waveguide 40 is arranged so that its longitudinal axis Xg is parallel to the optical axes $X_{oi}$ of the plurality of parabolic sections and so that its proximal end 41 is adjoining the reflective structure 21 between the second and third inner reflection faces 23, 24 (laterally, see FIG. 1) and at the active region 32 (vertically, see FIG. 3). The term "adjoining" refers to the fact that the proximal end 41 of the waveguide 40 is in contact with the reflective structure and the active region 32.

When the waveguide 40 is formed by the same material 13 as the photoelectric transducer 30 and comprises the quantum wells 13b, these are aligned with the longitudinal axis Xg of the guide (see FIG. 3). In this case, the waveguide 30 is adjoining the reflective structure 20 and the active region 32 by monolithic integration.

Thirdly, the lateral dimensions Lsr1 and Lsr2 (see FIG. 2) of the reflective structure 20 are strictly greater than the size Lg2 of the waveguide. For example, the height lateral dimension Lsr2 of the reflective structure 20 is 4 microns for a guide size Lg2 of 400 nm. In another example, the side height dimension Lsr2 of the reflective structure 20 is 4 microns for a guide size Lg2 of 220 nm. The side height dimension Lsr2 is then 18 times greater than the size Lg2 of the waveguide 40.

By virtue of the elements just described and their particular arrangement, the optical system 1 makes it possible, in each plane parallel to the substrate and over the entire height Lsr3 of the reflective structure 20, to channel light rays coming from the rear face 321 of the active region 32 and to direct them towards the proximal end 41 of the waveguide 40. It should be noted that, in the absence of the reflective structure 20, these rays do not reach the proximal end 41 of the waveguide 40. Thus, the luminosity (or optical power) at the exit of the assembly formed by the photoelectric transducer and the reflective structure is increased.

The path followed by the light rays coming from the rear face 321 of the active region 32 is illustrated using rays $r_{10}$ and $r_{20}$ represented in FIG. 1.

As the active region is positioned at the foci of the first inner reflection face 22, rays $r_{10}$ and $r_{20}$ are reflected on the first inner reflection face 22 in parallel to the optical axis $X_{oi}$. This first reflection gives rise to the rays $r_{11}$ and $r_{21}$ represented in FIG. 1.

As the second and third reflection faces 23, 24 are planar and orthogonal to the plane of the substrate and to the plane including the optical axes of the plurality of parabolic sections, rays $r_{12}$ and $r_{21}$ reflected a first time are reflected a second time and redirected in the same direction, which is therefore parallel to the optical axis $X_{oi}$. This second reflection gives rise to rays $r_{13}$ and $r_{23}$.

Finally, these rays from the two successive reflections are reflected a third time on the first inner reflection face 22. As they arrive on the first inner reflection face 22 in parallel to the optical axis $X_{oi}$, the reflected rays $r_{14}$ and $r_{24}$ are directed towards the focus Fi in front of which the proximal end 41 of the waveguide 40 is located. It is noted that the focus $F_i$ zone in which the reflected rays $r_{14}$ and $r_{24}$ are concentrated has dimensions comparable to those of the active region of the photoelectric transducer. This makes it possible to use a waveguide with a section of the same dimensions as those of the active region, without deteriorating the coupling efficiency. Being able to use a waveguide with a cross-section of the same dimensions as those of the active region offers the person skilled in the art the possibility of designing a single-mode guide while maintaining a high coupling efficiency.

The fact that the lateral height dimension Lsr2 of the reflective structure 20 is much greater, for example 18 times greater than the size Lg2 of the waveguide 40 makes it possible to channel rays emitted at a large angle θ with respect to the optical axis $X_{oj}$.

The second embodiment illustrated in FIG. 4 differs from the first embodiment in two respects.

Firstly, the first inner reflection face 22 is obtained by means of a wall of metal material 60 disposed in the first medium 51 and in proximity to the first inner reflection face 22. The first inner reflection face 22 thus works in total reflection.

Next, the waveguide 40 has a widened proximal end 41 and a funnel shape 44 at this end 41. In this configuration, the lateral dimensions Le1, Le2 of the active region 32 are adapted to the size of the enlarged end 41, via the size of the upper electrode 34. This configuration is conducive to better coupling of the incident optical power at the end 41 of the guide.

It should be noted that a layer of metal material (not represented in FIG. 3) may also be disposed in the second medium 52, in proximity to the second inner reflection face 23 and in proximity to the third inner reflection face 24, so that the second and third faces 24, 25 also work in total reflection.

A second aspect of the invention relates to a method 500 for manufacturing the optical system 1.

FIGS. 5A to 5E illustrate, in cross-section view, steps or sub-steps of manufacturing the optical system of FIG. 1, according to an embodiment.

The method 500 begins at step S501 illustrated in FIG. 5A with providing a substrate 10 comprising the substrate layer 11, the buffer layer 12 and the P-N junction 13, the latter comprising a lower N layer 13a, quantum wells 13b and an upper P layer successively connected from bottom to top. The P-N junction 13 is for example obtained by epitaxial growth and doping.

This step S501 is continued with step S502 represented in FIG. 5B. Step S502 consists in three dimensionally structuring the P-N 13 junction by lithography to create recesses and thus define an upper face 45 of the waveguide 40 and delimit part of the side surfaces of the reflective structure 20.

At the end of this first three dimension structuring S502, a cylindro-parabolic pillar 20a in accordance with the pillar forming the reflective structure 20 is created in the PN junction. This pillar 20a thus comprises the parabolic side face 25 and the planar side face 26 previously described.

Step S503 follows step S502. It is illustrated in FIG. 5C. Step S503 is a vertical etching step, also called mesa etching, performed on either side of the pillar 20a formed in step S502 to define the waveguide 40 at the planar side face 26 of the pillar 20a, to complete definition of the cylindro-parabolic pillar 20b forming the reflective structure 20, and to define the bonding layer 16.

The vertical etching step S503 is followed by a passivation step S504, illustrated in FIG. 5D, for conformally depositing a dielectric layer 51 onto the parabolic side surface 25 of the pillar 20b. The planar side surface 26 and the side and upper faces of the waveguide are in contact with air 52.

The dielectric layer 51 electrically insulates the parabolic side surface 26 of the reflective structure 20 at the same time as it creates an interface between the material 13 of the P-N junction and the dielectric, these having very contrasting refractive indices (2.4 for example for a P-N junction of GaN, and 1 for the dielectric).

At the end of step S504, the substrate 10 carries the waveguide 40 and the reflective structure 20. The reflective structure moreover comprises the first inner reflection face 22 and the second and third inner reflection faces 23, 24.

Finally, the waveguide is laterally adjoining the reflective structure 20 at its planar side surface 26, between the second and third inner faces 24, 25 (not represented in FIG. 5D) and at the quantum wells 13b, which are distributed along its longitudinal axis Xg. A bonding layer 16 connected to the lower region 13a has also been defined on the side of the parabolic side surface 25 of the reflective structure 20.

Step S505, which follows passivation step S504, is illustrated in FIG. 5E. This step S505 consists in forming the upper 34 and lower 35 electrodes.

For this, a first metal pattern 34 is formed on the upper face of the cylindro-parabolic pillar 20b, in proximity to the planar side surface 26, which corresponds to the level of the foci of the first inner reflection face 22.

A second metal pattern 35 in the form of a wall is also formed on the bonding layer 16. The metal wall 35 may or may not have the shape of the parabolic side surface 25.

A combination of photolithography, resin deposition and removal may be used in this step S505.

At the end of this step S505, the photoelectric transducer is obtained and the optical system 1 is completed.

The method 500 just described relates to a monolithic integration of the waveguide, the reflective structure and the photoelectric transducer.

It will be appreciated that this method can also be adapted in the case where the waveguide 40 and the reflective structure are formed by materials different from the material of the photoelectric transducer. In this case, the structuring step S502 comprises a combination of structuring and epitaxy sub-steps to define 1) the photoelectric transducer, 2) the cylindro-parabolic pillar 20b and 3) the upper face 45 of the waveguide 40.

It will be appreciated that the various embodiments and aspects of the inventions described previously are combinable according to any technically permissible combinations.

The articles "a" and "an" may be employed in connection with various elements, components, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:

1. An optical system comprising a substrate, a reflective structure, a photoelectric transducer and a waveguide, the reflective structure being formed by a cylindro-parabolic pillar disposed on the substrate, the cylindro-parabolic pillar being delimited by a cylindrical surface comprising a parabolic side surface and a planar side surface, and by two planar faces parallel to a plane of the substrate, and comprising:

a first inner reflection face with a parabolic profile disposed on the parabolic side surface of the cylindrical surface of the reflective structure, the first inner reflection face being defined by a plurality of parabolic sections parallel to the plane of the substrate, each parabolic section being defined by a parabola having an optical axis and a focus and extending from the vertex of the parabola to the straight line perpendicular to the optical axis and passing through the focus, a second inner planar reflection face and a third inner planar reflection face disposed on the planar side surface of the cylindrical surface of the reflective structure, the second and third inner planar reflection faces being orthogonal to the plane of the substrate and to the plane including the optical axes of the plurality of parabolic sections and located on either side of said plane including the optical axes at the foci of the plurality of parabolic sections, the photoelectric transducer comprising an active region configured to emit light waves or configured to receive light waves, and arranged so that the active region is positioned in the reflective structure, at a part of the foci of the plurality of parabolic sections, the material of the reflective structure being chosen to be transparent to light waves, the waveguide having a proximal end, a distal end and a longitudinal axis parallel to the optical axes of the plurality of parabolic sections, and arranged on the substrate so that the proximal end is adjoining the reflective structure, between the second and third inner planar reflection faces and at the active region.

2. The optical system according to claim 1, wherein a first medium is disposed outwardly of the reflective structure in a space adjacent to the first inner reflection face and a second medium is disposed outwardly of the reflective structure and the waveguide in a space adjacent to the second inner planar reflection face and in a space adjacent to the third inner planar reflection face, the first and second media having a refractive index strictly lower than the refractive index of the transparent material chosen for the reflective structure.

3. The optical system according to claim 2, wherein the first medium is formed by a dielectric material and the second medium comprises air.

4. The optical system according to claim 2, wherein the first and second media are formed by a dielectric material.

5. The optical system according to claim 3, wherein a wall of metal material is disposed in the first medium and in proximity to the first inner reflection face.

6. The optical system according to claim 1, wherein the photoelectric transducer is formed by a P-N junction and quantum wells disposed in the P-N junction and the transparent material chosen for the reflective structure is a material in which the P-N junction is formed.

7. The optical system according to claim 6, wherein the waveguide is formed by a material in which the P-N junction and the quantum wells are formed.

8. The optical system according to claim 6, wherein the material of the P-N junction is a III-V material.

9. The optical system according to claim 8, wherein the material of the P-N junction is a GaN-based material.

10. The optical system according to claim 1, wherein the photoelectric transducer comprises an upper electrode and a lower electrode, the upper electrode being positioned on an upper face of the reflective structure in vertical alignment with the predetermined zone for the active region, and having lateral dimensions corresponding to predetermined dimensions for the active region.

11. The optical system according to claim 1, wherein the reflective structure has a lateral height dimension in the plane of the substrate strictly greater than a size of the waveguide.

12. The optical system according to claim 1, wherein the waveguide comprises a proximal end enlarged relative to the dimensions of the waveguide.

13. A method for making an optical system according to claim 1, comprising:

providing a substrate comprising a substrate layer, a buffer layer arranged on the substrate layer and a P-N junction arranged on the buffer layer, three-dimensionally structuring the P-N junction so as to define an upper face of the waveguide as well as a part of the cylindro-parabolic pillar forming the reflective structure, structuring comprising lithography sub-steps, vertically etching the P-N junction on either side of the cylindro-parabolic pillar formed to complete definition of the waveguide and of the cylindro-parabolic pillar forming the reflective structure, and to define a bonding layer, passivating a first dielectric medium by conformal deposition outwardly of the cylindro-parabolic pillar, at the first inner reflection face, to obtain the reflective structure, and forming an upper electrode on the upper face of the P-N junction at the foci of the plurality of parabolic sections, and a lower electrode on the bonding layer to complete the photoelectric transducer and the optical system.

* * * * *